US006205868B1

(12) United States Patent
Miller

(10) Patent No.: US 6,205,868 B1
(45) Date of Patent: Mar. 27, 2001

(54) HALL-EFFECT SEAT BELT TENSION SENSOR

(76) Inventor: Gregory S. Miller, 51322 Elly Dr., Chesterfield Township, MI (US) 48051

(*) Notice: Subject to any disclaimer, the term of this patent is extended or adjusted under 35 U.S.C. 154(b) by 0 days.

(21) Appl. No.: 09/208,558

(22) Filed: Dec. 9, 1998

Related U.S. Application Data

(60) Provisional application No. 60/069,172, filed on Dec. 10, 1997.

(51) Int. Cl.$^7$ ....................................... G01L 1/26
(52) U.S. Cl. .................. 73/862.391; 324/207.2; 324/207.26
(58) Field of Search ............... 324/207.26, 207.2, 324/235; 73/862.391, 862.451, 862.44; 280/735; 180/268

(56) References Cited

U.S. PATENT DOCUMENTS

| | | | |
|---|---|---|---|
| 2,452,302 | 10/1948 | Hitchen | 73/862.471 |
| 3,426,589 | 2/1969 | Brendel | 73/862.471 |
| 3,462,731 | 8/1969 | Gray | 340/457.1 |
| 3,618,378 | 11/1971 | Shull et al. | 73/862.474 |
| 3,817,093 | 6/1974 | Williams | 73/862.474 |
| 4,597,297 | 7/1986 | Smith | 73/862.48 |
| 4,846,000 | 7/1989 | Steinseifer | 73/862.47 |
| 5,157,966 | 10/1992 | Lugosi et al. | 73/118.1 |
| 5,329,822 | 7/1994 | Hartel et al. | 73/862.61 |
| 5,511,820 | 4/1996 | Hatfield | 280/733 |
| 5,714,693 | 2/1998 | Sturm | 73/862.454 |
| 5,965,827 | * 10/1999 | Stanley et al. | 73/862.321 |

FOREIGN PATENT DOCUMENTS 0 531 753 B1  2/1995  (EP).

OTHER PUBLICATIONS

DE 40 39 121 A1 (Saurer–Allma GMBH) Jun. 13, 1991.

* cited by examiner

*Primary Examiner*—Walter E. Snow
(74) *Attorney, Agent, or Firm*—Lyon P.C.

(57) ABSTRACT

A tension sensor (10) for a vehicle seatbelt (12) comprises a base (14) having a pair of guide pin blocks (16) and (18) depending therefrom, and a plurality of spaced upper and lower guide pins, 20 and 22 respectively, for guiding the seatbelt (12). A plunger housing (30) having an orifice (32) therein for acceptance of a movable plunger (40) is secured to the base (14). The plunger (40) has an upper portion (42) shaped to allow the seatbelt (12) to travel over the plunger (40) with minimal friction. A plurality of springs (46) are disposed between the base (14) and the plunger (40) to bias the plunger (40) against the lateral force of the seatbelt (12) when under tension. A permanent magnet (50) secured to the plunger moves into close proximity to a Hall effect sensor (52) when the plunger (40) is depressed by the seatbelt (12). The Hall effect sensor (52) has an output (54) responsive to the magnetic flux therein.

9 Claims, 2 Drawing Sheets

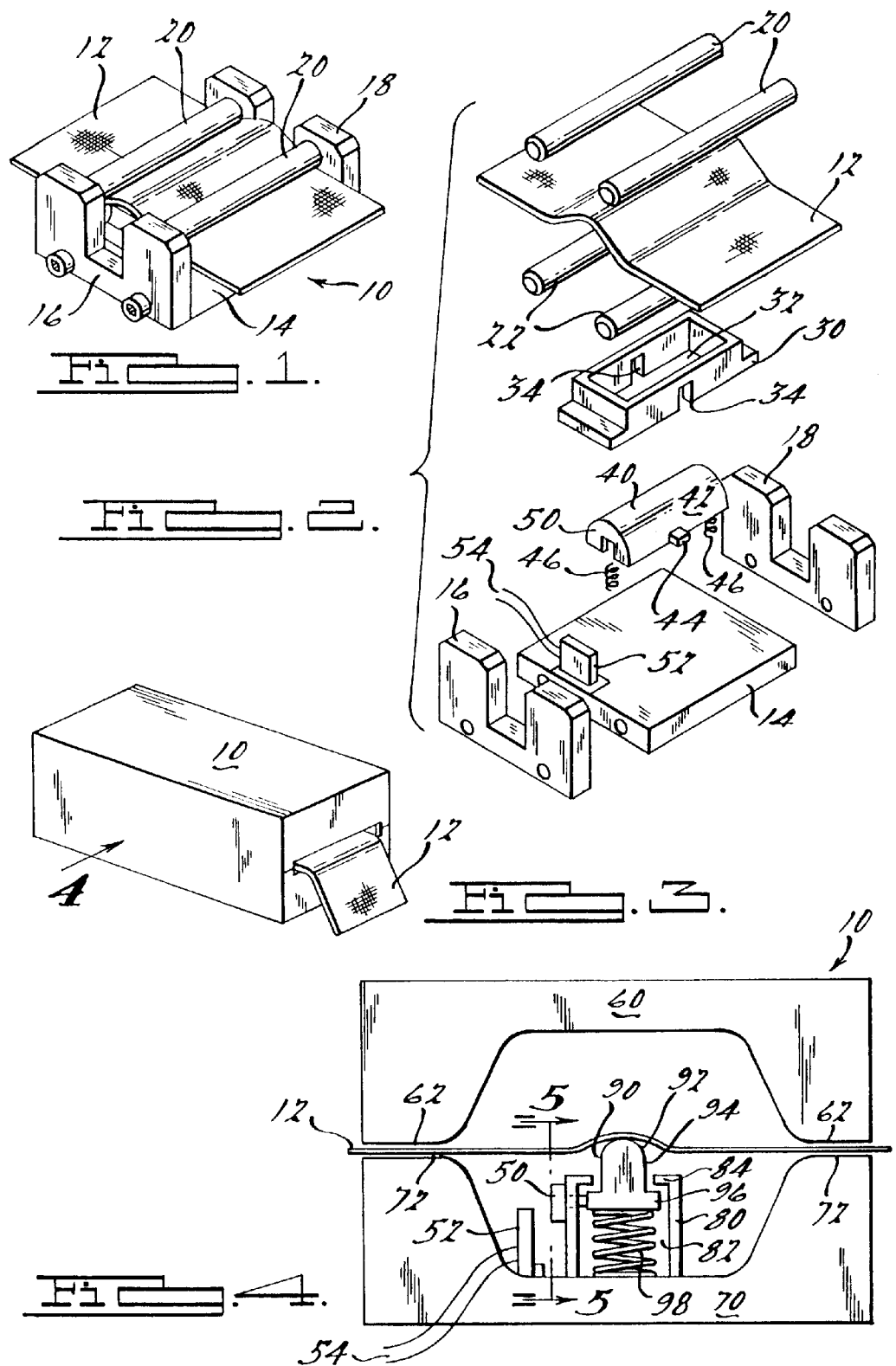

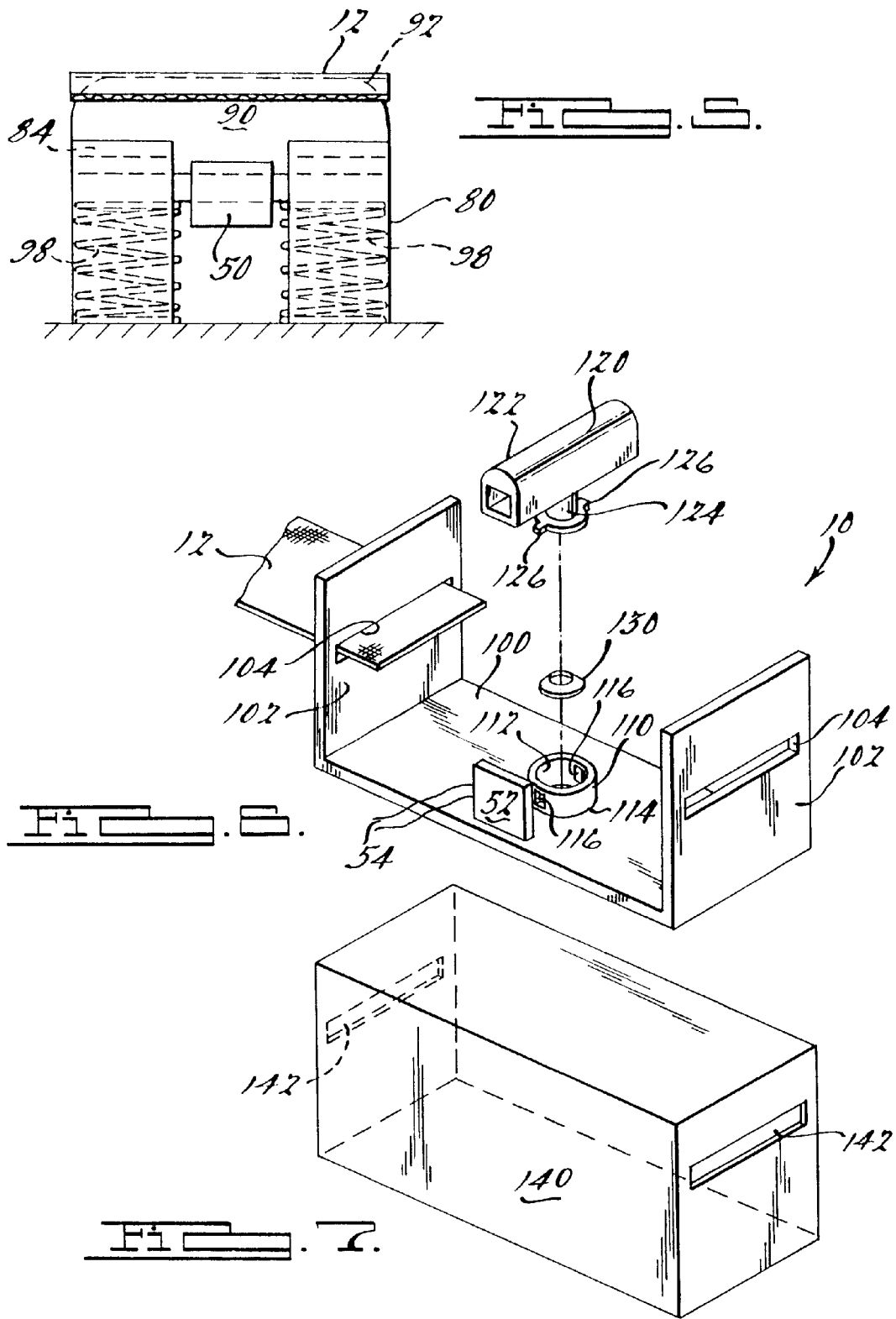

HALL-EFFECT SEAT BELT TENSION SENSOR

CROSS REFERENCE TO RELATED APPLICATIONS

The instant application claims the benefit of U.S. Provisional Application Serial No. 60/069,172, filed Dec. 10, 1997, and entitled "Hall Effect Seat Belt Tension Sensor".

TECHNICAL ART

The instant invention relates generally to automotive passenger restraint systems and more specifically to a sensor for measuring seatbelt tension in a vehicle utilizing a Hall effect sensor.

BACKGROUND OF THE INVENTION

Automotive manufacturers and the National Highway Transportation Safety Association are investigating methods to disable vehicle air bags in situations where they may cause more harm than good. Typically, airbags have been developed to deploy with enough force to restrain a 175 lb. adult in a high velocity crash. Deployment of the same air bags when children are seat occupants may cause serious injury due to the force generated upon inflation of the bag.

As a result, seat weight sensors and seatbelt tension systems are being developed in an attempt to determine whether a seat occupant is a child. Such systems should identify when the occupant is small, or even when a child is in a rear facing infant seat, a forward facing child seat or a booster seat. Occupant weight measurement when a child seat is present is further complicated by the downward force applied to the child seat by the tension of a seat belt. When a child seat is strapped tightly, the seat belt forces the child seat into the vehicle seat and can often artificially increase the measured weight, which may lead to air bag deployment when children or infants are present in the seat.

Tension measurement mechanisms have been incorporated in the buckle of a seatbelt. In one embodiment, a sliding buckle is biased with a spring. When the belt is under heavy tension, the buckle pulls forward to control a switch that provides feedback to a vehicle processor.

Additionally, it is known to detect seat belt tension by attaching a spring steel bend sensor to one side of the belt. When belt tension increases, a resistance change occurs in the sensor and the analog signal is converted to an approximate belt tension. However, field test indicates that such sensors tend to drift with temperature and, therefore require temperature compensation.

The aforementioned seat belt tension measurement methods suffer from a number of disadvantages. Initially, a great number of additional parts are required for seat belt retractors or buckle configurations thereby adding complexity and cost to vehicle assembly and providing considerable difficulty in retrofitting existing vehicles. Additionally, mechanical switches and bend sensor systems have a limited service life, thereby requiring periodic replacement or adjustment.

The present invention may be used to detect whether the seat belt is under high tension thereby indicating that an infant seat or another inanimate object is belted into the seat. The instant invention can be used in conjunction with a seat weight sensor to determine whether an airbag should be deployed for a given occupant. Additionally, the instant invention provides a continuous measurement of seat belt tension and may be used to provide a threshold level of detection where desired.

SUMMARY OF THE INVENTION

The instant invention overcomes the aforementioned problems by providing a vehicle seat belt tension measurement system incorporating a Hall effect sensor capable of detecting the level of tension in a seatbelt.

The present invention measures tension by routing a seat belt through a sensor wherein the seat belt travels over a plunger biased upwardly by spring force. The plunger has a permanent magnet secured thereto that is brought in close proximity to a Hall effect sensor as increased seatbelt tension forces the plunger downwardly against the spring force.

The sensor comprises a plurality of belt guides for routing the seat belt over and across the shaped plunger. As tension in the seat belt increases, the plunger is displaced downwardly.

A "Hall effect" sensor secured to the sensor housing is responsive to the amount of magnetic flux therethrough. As the permanent magnet secured to the plunger comes in close proximity to the Hall effect sensor, the sensor is subjected to varying amounts of magnet flux produced by the magnet and generates an output responsive thereto. The output signal from the Hall effect sensor is operatively coupled to the input of a microprocessor for controlling a passenger restraint system. The microprocessor is correspondingly provided with an output, or a plurality thereof, to the passenger restraint system whereby an output signal is generated to inhibit deployment of an airbag or modify its inflation characteristics upon detection of high belt tension.

Hall effect sensors are known-in-the-art semiconductor devices that operate on the principle that a magnetic field applied perpendicular to the direction of a current flow through the semiconductor causes an electric field to be generated therein. This resultant electric field in the semiconductor material is generally perpendicular to both the direction of current flow and the magnetic field applied thereto. The electric field generates a voltage that may be measured across the semiconductor, thereby providing an indication of the magnetic field strength applied to the semiconductor. A variety of Hall effect sensors are readily available, from sensors that provide continuous analog output voltages to sensors that provide a digital output responsive to a predetermined level of magnetic flux. The latter can be used where threshold belt tension detection is desired. Hall effect sensors are robust and are insensitive to temperature fluctuations, thereby obviating the need for periodic recalibration and adjustment.

The microprocessor calculates seat belt tension from the voltage signal provided by the Hall effect sensor. The belt tension calculated by the microprocessor is used to determine the presence of an inanimate object or an infant seat. If a belt tension greater than ten pounds is detected, for example, it is unlikely that a person is present in the vehicle seat because belt tensions greater than ten pounds are generally uncomfortable for passengers. Accordingly, when high belt tension is detected, the microprocessor generates an output to the air bag control system that inhibits air bag deployment.

Furthermore, because commercially available Hall effect sensors have proven reliable in sensor technology applications, the instant invention provides a robust seat belt tension measurement system readily retrofitted to existing automobiles without the need for alteration or re-qualification of existing seat belt systems. This provides a significant advantage to automotive manufacturers by eliminating the cost and time involved in qualifying a safety restraint system to meet federal standards.

Therefore, one object of the instant invention is to provide a seat belt tension measurement sensor that incorporates reliable sensor technology to measure seatbelt tension and provide a signal to an airbag control system to inhibit deployment of an airbag when an infant seat is present.

Yet another object of the instant invention is to provide a seat belt tension measurement system having a simple mechanical design that does not require re-qualification of the seat belt system prior to use by automotive manufacturers.

A yet further object of the instant invention is to provide a seat belt tension measurement system that is insensitive to changes in temperature.

A yet further object of the instant invention is to provide a seat belt tension measurement system that generates either a continuous or threshold measurement of seat belt tension rather than threshold-type tension measurement.

The instant invention will be more fully understood after reading the following detailed description of the preferred embodiment with reference to the accompanying drawing figures. While this description will illustrate the application of the instant invention in the context of an automotive safety restraint system, it will be readily understood by one of ordinary skill in the art that the instant invention may also be utilized in other tension measurement applications unrelated to vehicle passenger restraints.

BRIEF DESCRIPTION OF THE DRAWINGS

FIG. 1 is a perspective view of the preferred constructed embodiment of the instant invention.

FIG. 2 is an exploded perspective view of the preferred embodiment of the invention.

FIG. 3 is a perspective view of an alternative embodiment of the instant invention.

FIG. 4 is a view of the invention taken in the direction of line 4—4 of FIG. 3.

FIG. 5 is a view of the instant invention taken along line 5—5 of FIG. 4.

FIG. 6 is an exploded perspective view of an alternative embodiment of the present invention.

FIG. 7 is a perspective view of the alternative embodiment of the instant invention shown in FIG. 6.

DETAILED DESCRIPTION OF THE PREFERRED EMBODIMENTS

Referring to FIGS. 1 and 2, and in accordance with a preferred constructed embodiment of the instant invention, a seatbelt tension measurement system 10 for a seat belt 12 comprises a base 14 having first and second opposed guide pin blocks, 16 and 18 respectively, depending therefrom. A plurality of spaced upper guide pins 20 and a plurality of spaced lower guide pins 22 extend between and are secured to the opposed guide pin blocks 16 and 18. The upper guide pins 20 lie in spaced relation to the lower guide pins 22 to allow the seatbelt 12 to be disposed therebetween.

A plunger housing 30 having an orifice 32 and a plurality of slots 34 disposed therein is secured to the base 14 between the lower guide pins 22. The orifice 32 of the plunger housing 30 is shaped to accept a plunger 40 therein. The plunger 40 has an upper portion 42 shaped to allow the seatbelt 12 to slide across the plunger 40 with minimal friction. The plunger 40 further has a plurality of detents 44 depending therefrom that engage the plurality of detent slots 34 in the plunger housing 30 to secure the plunger 40 within the housing 30.

A plurality of springs 46 are disposed between the plunger 40 and the base 14. The springs 46 bias the plunger 40 upwardly, towards the upper guide pins 20.

A permanent magnet 50 is secured at a point to the plunger 40. A Hall effect sensor 52 is secured to the base 14 at a point wherein the magnet 50 is moved in proximity to the sensor 52 as the plunger 40 is biased downwardly against the spring 46 force by the seatbelt 12, which is routed over the upper 20 and lower 22 guide pins and over the plunger 40. As the magnet 50 approaches the Hall effect sensor 52, the magnetic field produced by the magnet 50 permeates the sensor 52. Accordingly, the sensor 52 produces an electrical output 54 responsive to the strength of the magnetic field therethrough. The Hall effect sensor output 54 is operatively connected to a microprocessor (not shown) for controlling a vehicle passenger restrain such as an airbag.

A wide variety of Hall effect sensors 52 are readily available to detect varying levels of seatbelt tension. For example, simple tension threshold detection can be accomplished by employing a Hall effect sensor 52 having a digital (or discrete) output 54 whereby the output 54 is activated when the sensor 52 is permeated by a predetermined magnetic field strength. The position of the permanent magnet 50 can be adjusted such that it triggers the output 54 of the sensor 52 only when a predetermined level of seatbelt 12 tension is present. In this fashion it is possible to detect, for example, the presence of an infant seat belted into a vehicle by determining the level of seatbelt 12 tension above which an occupant would be uncomfortable. Furthermore, the sensor 10 can be tailored to detect various seatbelt 12 tension loads by adjusting the spring 46 rate on the plunger 40 as well as by adjusting the spacing between the permanent magnet 50 and the Hall effect sensor 52. In contradistinction, the Hall effect sensor 52 may provide a continuous analog output 54 whereby the output 54 is a time-varying analog or digital signal responsive to the magnetic field strength permeating the sensor 52.

In an alternative embodiment of the instant invention, and referring to FIGS. 3, 4 and 5, a seatbelt tension sensor 10 can comprise an upper housing 60 having a pair of spaced integral seatbelt guides 62 depending therefrom. A lower housing 70 having a pair of spaced integral seatbelt guides 72 depending therefrom is secured to the upper housing 60. The lower seatbelt guides 72 lie in spaced relation to the upper seatbelt guides 62 to allow the seatbelt 12 to travel freely therebetween.

A plunger housing 80 depends from the lower housing 70 between the guides 72, and has an orifice 82 therein defined by a housing lip portion 84. A plunger 90 is disposed within the orifice 82 of the plunger housing 80. The plunger 90 has an upper portion 92 shaped to allow the seatbelt 12 to slide across with minimal friction. The plunger 90 also has a lower portion 94 having a lip 96 depending therefrom. The lip 96 engages the lip portion 84 of the plunger housing 80, thereby securing the plunger 90 within the housing 80. A plurality of springs 98 are disposed between the plunger 90 and the lower housing 70 to bias the plunger 90 upwardly towards the upper housing 60.

As in the preferred embodiment of the instant invention, the instant embodiment further comprises a permanent magnet 50 secured at a point to the plunger 90. A Hall effect sensor 52 is secured to the lower housing 70 at a point wherein the magnet 50 is moved in proximity to the sensor 52 as the plunger 90 is biased downwardly against the spring 98 force by the seatbelt 12, which is routed between the upper and lower belt guides, 62 and 72 respectively, and over the plunger 90. As the magnet 50 approaches the Hall effect sensor 52, the magnetic field produced by the magnet 50 permeates the sensor 52. The sensor 52 then produces an electrical output 54 responsive to the strength of the magnetic field therethrough. The output 54 is operatively connected to a microprocessor (not shown) for controlling a vehicle passenger restraint such as an airbag.

In another alternative embodiment of the instant invention as depicted in FIG. 6, a seatbelt tension sensor 10 comprises a base 100 having a pair of integral seatbelt guides 102 depending therefrom. Each of the seatbelt guides 102 has a slot 104 therein to allow the passage of the seatbelt 12 therethrough.

A right circular cylindrical plunger housing 110 has an open upper end 112 and a lower end 114 secured to the base 100 between the seatbelt guides 102. The plunger housing 100 further has a plurality of detent slots 116 therein.

A plunger 120 is provided, having an upper portion 122 shaped to allow the seatbelt 12 to travel across the plunger 120 with minimal friction and having a right circular cylindrical lower portion 124 having a plurality of detents 126 depending therefrom. The plunger lower portion 124 is disposed within the plunger housing 110. The plunger lower portion 124 detents 126 engage the housing 110 detent slots 116, thereby securing the plunger 120 within the housing 110.

Furthermore, a belleville spring (or belleville washer) 130 is disposed between the plunger lower portion 124 and the base 100 thereby biasing the plunger 120 upwardly, away from the base 100.

As in the preferred embodiment of the instant invention, the instant embodiment further comprises a permanent magnet 50 secured at a point to the plunger 120. A Hall effect sensor 52 is secured to the base 100 at a point wherein the magnet 50 is moved in proximity to the sensor 52 as the plunger 120 is biased downwardly against the belleville spring 130 force by the seatbelt 12, which is routed through the slots 104 in the seatbelt guides 102, and over the plunger 120. As seatbelt 12 tension increases, the plunger 120 is depressed thereby moving the magnet 50 into proximity with the Hall effect sensor 52 causing the magnetic field produced by the magnet 50 to permeate the sensor 52. The sensor 52 then produces an electrical output 54 responsive to the strength of the magnetic field therethrough. The output 54 is operatively connected to a microprocessor (not shown) for controlling a vehicle passenger restraint, for example, an airbag. As shown in FIG. 7, a sensor cover 140 having a pair of opposed slots 142 therein for acceptance of a seatbelt may be provided to protect the sensor 10.

While specific embodiments of the instant invention have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A tension sensor for a seatbelt comprising:

a base having first and second opposed guide pin blocks depending therefrom;

a plurality of spaced upper guide pins secured to and extending between the opposed guide pin blocks;

a plurality of spaced lower guide pins secured to and extending between the opposed guide pin blocks in spaced relation to said plurality of upper guide pins;

a plunger housing secured to said base having a plunger orifice and a plurality of detent slots therein;

a plunger disposed within the plunger orifice of said plunger housing having an upper portion shaped to allow said seatbelt to move thereacross and having a plurality of detents depending therefrom wherein the detents engage the detent slots of said plunger housing;

a plurality of springs disposed between said plunger and said base for biasing said plunger toward said upper guide pins;

a permanent magnet secured at a point to said plunger; and a Hall effect sensor secured to said housing at a point wherein the magnetic flux of said permanent magnet varies through said Hall effect sensor when said plunger is biased toward said base, said Hall effect sensor having an output responsive to the magnetic flux therein.

2. A tension sensor for a seatbelt comprising:

an upper housing having a pair of spaced, integral seatbelt guides depending therefrom;

a lower housing secured to said upper housing having a pair of spaced, integral seatbelt guides depending therefrom, the seatbelt guides lying in spaced relation to the seatbelt guides of said upper housing;

a plunger housing depending from said lower housing between the seatbelt guides thereof, said plunger housing having an orifice therein defined by a housing lip portion;

a plunger disposed within the orifice of said plunger housing having an upper portion shaped to allow said seatbelt to move thereacross and a lower portion having a lip depending therefrom that engages the plunger housing lip portion thereby securing said plunger in said plunger housing;

a plurality of springs disposed between said plunger and said lower housing for biasing said plunger toward said upper housing;

a permanent magnet secured at a point to said plunger; and a Hall effect sensor secured to said lower housing at a point wherein the magnetic flux of said permanent magnet varies through said Hall effect sensor when said plunger is biased toward said lower housing, said Hall effect sensor having an output responsive to the magnetic flux therein.

3. A tension sensor for a seatbelt comprising:

a base having a pair of spaced seatbelt guides, each having a slot therein for acceptance of said seatbelt;

a right circular cylindrical plunger housing having an open upper end and a lower end secured to said base between the pair of seatbelt guides, said housing having a plurality of detent slots therein;

a plunger having an upper portion shaped to allow said seatbelt to move thereacross and a right circular cylindrical lower portion having a plurality of detents depending therefrom, the lower portion disposed within said plunger housing wherein the detent slots thereof are engaged by the detents of said plunger lower portion;

a belleville spring disposed between said plunger lower portion and said base for biasing said plunger upwardly, away from said base;

a permanent magnet secured at a point to said plunger; and a Hall effect sensor secured at a point to said base wherein the magnetic flux of said permanent magnet varies through said Hall effect sensor when said plunger is biased toward said base, said Hall effect sensor having an output responsive to the magnetic flux therein.

4. A tension sensor for a seatbelt as claimed in claim 1 wherein the output of said Hall effect sensor is analog.

5. A tension sensor for a seatbelt as claimed in claim 1 wherein the output of said Hall effect sensor is digital.

6. A tension sensor for a seatbelt as claimed in claim 2 wherein the output of said Hall effect sensor is analog.

7. A tension sensor for a seatbelt as claimed in claim 2 wherein the output of said Hall effect sensor is digital.

8. A tension sensor for a seatbelt as claimed in claim 3 wherein the output of said Hall effect sensor is analog.

9. A tension sensor for a seatbelt as claimed in claim 3 wherein the output of said Hall effect sensor is digital.

* * * * *

UNITED STATES PATENT AND TRADEMARK OFFICE
CERTIFICATE OF CORRECTION

PATENT NO. : 6,205,868 B1  
DATED : March 27, 2001  
INVENTOR(S) : Miller

Page 1 of 1

It is certified that error appears in the above-identified patent and that said Letters Patent is hereby corrected as shown below:

Title page,
Item [73], Assignee, should read --
Automotive Systems Laboratory, Inc.
27200 Haggerty Road
Suite B-12
Farmington Hills, Michigan 48331 --

Signed and Sealed this

Thirtieth Day of April, 2002

Attest:

Attesting Officer

JAMES E. ROGAN
Director of the United States Patent and Trademark Office